June 25, 1963 W. R. GABBERT 3,094,717
SINKER APPLICATOR FOR FISHING LINES
Filed Sept. 2, 1960
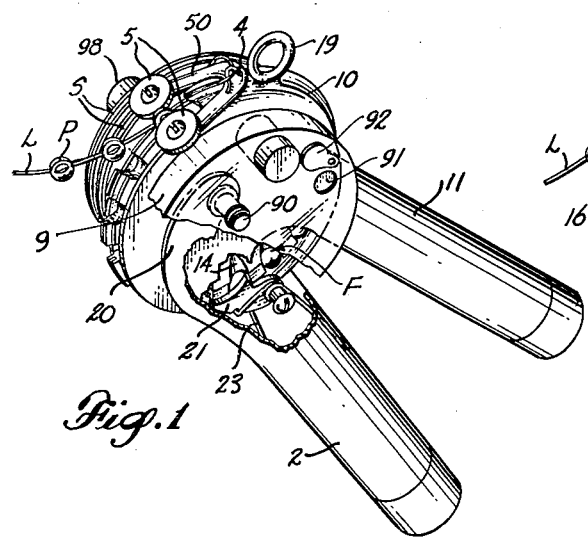
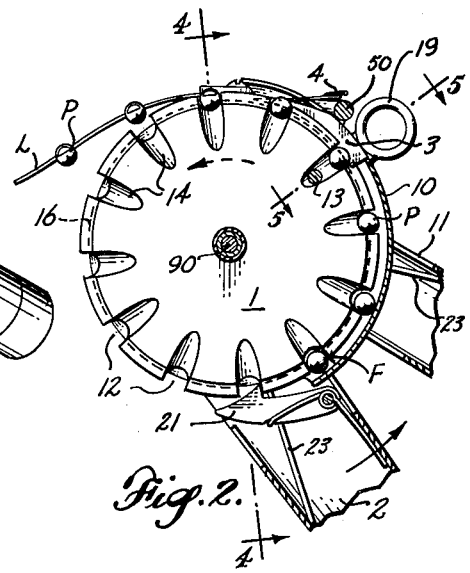
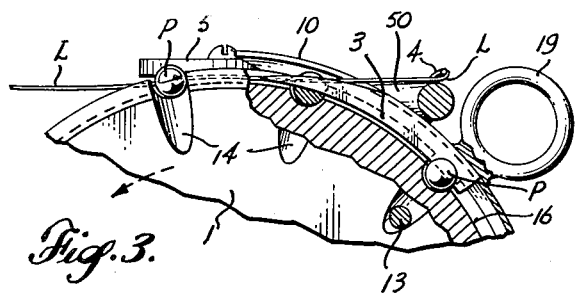
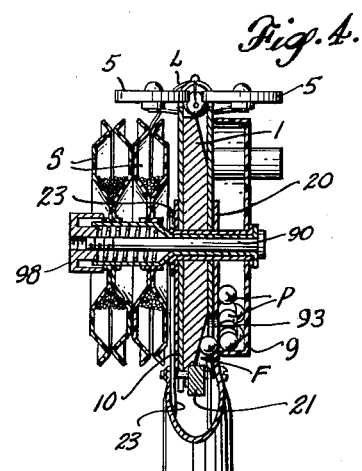
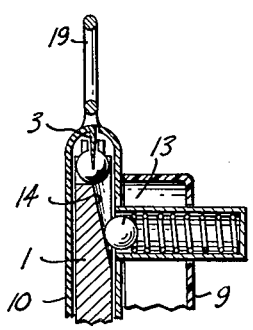
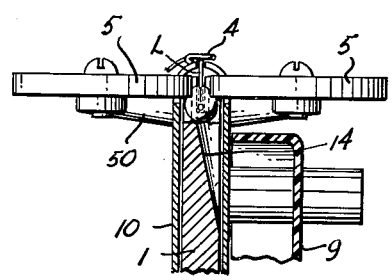
INVENTOR.
WALTER R. GABBERT
BY
Reynolds & Christensen
ATTORNEYS

United States Patent Office 3,094,717
Patented June 25, 1963

3,094,717
SINKER APPLICATOR FOR FISHING LINES
Walter R. Gabbert, 21 S. Delaware, Wenatchee, Wash.
Filed Sept. 2, 1960, Ser. No. 53,792
17 Claims. (Cl. 7—14.1)

The present invention concerns a tool for use by a fisherman, to apply lead shot weights to a fishing line or leader, including the term "leader" within the terms "fishing line" or "line" as hereinafter used. This application is an improvement of that filed by me October 28, 1959, Serial No. 849,404, and now abandoned.

Such a weight is normally a spherical pellet. These are sometimes marketed already slit, but many are not. Before an unslit pellet can be applied to a line it must be slit to form a diametral groove in which to receive the line. Thereafter the line must be guided into the slit, and the slit must be closed over the line to retain the pellet upon the line. Each such operation, on small shot pellets of lead, under conditions obtaining at the point of use, is rather difficult to perform.

The primary object of this invention is to provide a tool capable of being charged with a number of pellets, and operable by successive squeezing operations or the like to apply individual pellets to the line, or to different lines as they are presented in turn to the tool. More particularly, it is the object to provide in such a tool a line guide, a slitting knife, a crimping means, and a means for segregating and advancing individual pellets past these in succession, and for retaining the line in proper relationship to such a pellet, and the pellet in correct orientation to the slitting knife, line guiding means, and crimping means, whereby as each pellet is slit, the line is guided into and laid in the slit, and the pellet is crimped to close the slit on the line, all automatically and in rapid succession.

It is also an object to provide a tool of the general nature indicated which will operate to apply a pellet to the line and to crimp the pellet upon the line, and to insure orientation of the slit correctly relative to the line guide and crimping means, so that proper engagement will be made between the line and the pellet, and between the pellet as it advances and the crimping means, without producing any problem due to rotation of the pellet as it advances from one such station.

Also it is an object to provide such a device wherein a ratchet-advanced wheel, notched about its periphery to receive the individual shot in its notches, is rotated by a squeezing action to advance the shot through the successive stations, and to continue on step by step, to receive successive shots for application to the line.

Detailed objects will appear more fully hereinafter. The invention comprises the novel parts and the novel combination and arrangement thereof which is shown in the accompanying drawings in a presently preferred form, and which is hereinafter described and claimed, generically as well as specifically.

In the original application identified above, of which this is an improvement, the shot was advanced through the several stations by a plunger guided for straight-line movement within a tube. That form is contemplated, and claims herein are generic to that form and to the present form, but for convenience of manufacture and of use it is preferred that the rotational type, ratchet advanced, which is shown in the accompanying drawings be employed.

FIGURE 1 is an isometric view, partly broken away, illustrating the tool in its presently preferred form, in the operation of applying pellets to a line.

FIGURE 2 is a side elevational view, with the near side casing removed, illustrating the ratchet wheel and the means for advancing the same, and the relationship of the slitting, line-guiding, and pellet-crimping means.

FIGURE 3 is an enlarged detail view similar to FIGURE 2, showing to a larger scale the slitting knife, the line guiding means, and the crimping means, in conjunction with the pellet-advancing wheel.

FIGURE 4 is an axial sectional view through the tool, substantially on the line 4—4 of FIGURE 2, and illustrating in addition to the tool itself the support provided thereby for two spools which are capable of carrying leaders of different strength.

FIGURE 5 is a transverse sectional view substantially at the line indicated at 5—5 in FIGURE 2, illustrating the ratchet detent mechanism and the slitting knife, the latter in engagement with a pellet.

FIGURE 6 is a similar cross-sectional view to a larger scale than FIGURE 4, illustrating the crimping mechanism.

The pellets P are received within a magazine which includes the casing 9 supported upon a spindle 90, whereby the magazine is alongside an intermittently advanced ratchet wheel 1, which is also supported upon the spindle 90 and rotates thereabout. Communication between them is afforded at the point F (FIGURE 2) for delivery of one pellet at a time from the magazine to the wheel. The housing 10 about the ratchet wheel 1 is made fast to an arm 11 that may be termed the fixed arm, and a second limitedly oscillatable arm 2 pivoted by the ears 20, also about the spindle 90, carries a pawl 21 which engages the ratchet wheel 1 when the arms 2 and 11 are caused to approach one another, to advance the ratchet wheel 1 through a given distance. This distance is determined by the spacing between notches 12 in the periphery of the wheel 1 each of which is of a size to receive one of the pellets P as it exits at F through a hole 93 (FIGURE 4) provided in the magazine, into the interior of the housing 10 wherein is the ratchet wheel 1. A spring-pressed detent 13 supported at one side of the housing 10 (see FIGURE 5) engages within depressions 14 which are angularly spaced the same as the notches 12, and this detent 13 prevents retrograde movement of the wheel relative to arm 2 after it has been advanced by the spacing between notches 12. A return spring 23 reacts between arms 2 and 11 to return arm 11 to its initial position relative to arm 2, when released, or return can be manually effected.

From the feed point indicated at F in FIGURE 2 each pellet is advanced, as it lies within its notch 12 of the wheel 1, and it next engages a fixed slitting knife 3. The pellet is forced past the slitting knife, and in thus forcing it the pellet is slit diametrally, as is best seen in FIGURE 5, and by the continuation of the slitting knife riding within the slit the pellet remains in the correct orientation, with its slit radially outermost.

A line guide is provided between the two elements 4, which are located externally of the housing 10, just beyond the slitting knife, or at a point where a line L is guided by the line-guiding elements 4 will engage within the slit of the pellet before the latter has passed beyond the slitting knife and can rotate from correct orientation. After the line is received within the slit, the line maintains correct orientation of the pellet. The periphery of the wheel 1, incidentally, is circumferentially slit as indicated at 16 to span the slitting knife and to permit reception of the line within this circumferential slit 16, and it may be seen so entered in FIGURE 3.

Beyond the line guide and the slitting knife there is provided a crimping means at a crimping station. This may conveniently consist of a pair of rollers 5 supported fixedly upon a bracket 50, and spaced apart sufficiently, at opposite sides of the slit, that as the pellet passes these crimping wheels 5 they will crowd together the opposite sides of the slit, and so close the slit upon the line L, and in that way will prevent disengagement of the pellet from the line.

When a pellet is to be crimped upon a line the line, running through the line guide means 4, is led within the slit 16 of the wheel 1 past the slitting knife 3 and the crimping wheels 5. The handles 2, 11 are squeezed together, whereby the ratchet pawl 21 advances the wheel 1 by the spacing between adjacent notches 12, and a pellet already in position within a notch 12 passes the slitting knife 3, is slit, and the line enters the slit, after which the pellet passes the crimping wheels 5 and is crimped from opposite sides of the slit upon the line, finally emerging securely applied to the line. One or several pellets may be applied, depending on whether the line is maintained in position and whether the handles 2, 11 are squeezed more than once.

Various conveniences are employed, such, for instance, as the charging opening 91 of the casing 9, of a size just enough larger than pellets of the size intended that larger pellets may not enter, which is closed by a disk 92, a ring 19 whereby the tool may be hung from a belt or any convenient place handy to the fisherman, and spools S for different weights of leaders which are supported upon the spindle 90 and held in place by a nut 98. The arms 2, 11 may be hollow, and serve as receptacles for hooks or the like. All such measures add to the convenience of the tool but are not strictly necessary.

It will be apparent that the slitting knife, by its engagement within the diametral slit of a pellet, will prevent that pellet from rotating—for instance by frictional engagement with the interior surfaces of the housing 10—from the correct orientation for reception of a line within the slit. The line enters the slit before the slit passes from engagement with the slitting knife, and thereafter the line prevents disorientation of the pellet. Finally the crimping means engage the pellet while it is still oriented by the line, and due to the correct orientation the crimping is properly effected.

I claim as my invention:

1. A device for applying lead sinkers to a fishing line comprising receiver means defining a tubular passage adapted to receive the sinkers and including means for propelling the sinkers through the passage, means for forming a slit in each sinker as it is propelled along the passage, and means adjacent said passage for thereafter crimping the sinker transverse the slit therein.

2. A device according to claim 1 further comprising means for guiding a fishing line into the sinker slit intermediate the forming thereof and the crimping thereof.

3. A device for applying lead sinkers to a fishing line comprising receiver means defining a tubular passage adapted to receive the sinkers and including sinker engaging means movable along the passage, means for actuating the sinker engaging means to move along the passage to propel the sinkers therethrough, means extending into said passage for forming a slit in each sinker as it is propelled therelong, and means mounted adjacent one end of said passage for thereafter crimping the sinker transverse the slit therein.

4. A device according to claim 3 wherein the slit forming means includes a knife member extending lengthwise of the passage and terminating outside said end thereof adjacent said crimping means.

5. A device according to claim 4 wherein the crimping means includes roller means forming a nip disposed in the plane of the knife member adjacent the terminal portion thereof.

6. A device for applying lead sinkers to a fishing line comprising receiver means defining a tubular passage adapted to receive the sinkers and including a movable member forming one wall of said passage, said wall having sinker engaging means spaced at regular intervals therealong, means for moving the member through the passage to propel the sinkers therealong, means extending into said passage to form a slit in each sinker as it is propelled therealong, and means mounted adjacent one end of said passage for thereafter crimping the sinker transverse the slit therein.

7. A device according to claim 6 wherein said wall has sinker engaging recesses therein spaced at regular intervals therealong.

8. A device according to claim 6 wherein the slit forming means includes a knife member extending lengthwise of the passage along a plane normal to said wall and terminating outside said end of the passage adjacent said crimping means.

9. A device according to claim 8 wherein the crimping means includes roller means forming a nip disposed in said plane.

10. A device according to claim 9 wherein the terminal portion of the knife tapers on an incline approaching the end portion of the nip adjacent said wall.

11. A device for applying lead sinkers to a fishing line comprising a receiver member mounted for rotation about an axis therethrough and having a circular peripheral surface formed about said axis, an arcuate channel member so mounted about said surface as to define therewith an arcuate tubular passage adapted to receive said sinkers, said surface having sinker engaging recesses therein spaced at regular intervals therealong, means for moving the receiver member through an angle defining at least one of said intervals whereby the sinkers are propelled intermittently through an arcuate path having a portion thereof formed by said passage, a knife so extending into said portion of the path in the passage as to form a slit in each sinker as it is propelled therealong, and a pair of rollers so mounted adjacent one end of the passage as to define therebetween a nip disposed in said path and adapted to crimp the sinker transverse the slit therein.

12. A device according to claim 11 wherein the knife extends lengthwise of the passage from said channel member along a plane normal to said surface and terminates outside said end of the passage adjacent the nip between the rollers, the terminal portion of said knife being tapered from said channel member towards said surface on an incline approaching the bottom of the nip, whereby the orientation of the sinker slit is maintained by the knife as the sinker moves up to the nip.

13. A device according to claim 12 further comprising means mounted on the channel member adjacent said end of the passage to guide a fishing line into the sinker slit as the sinker disengages from said terminal portion of the knife.

14. A device according to claim 11 wherein the receiver moving means includes a pawl mounted to engage the receiver member and means for actuating the pawl to move the receiver member through said angle.

15. A device according to claim 11 further comprising pressure retractable means for restraining the receiver member against movement.

16. A device according to claim 15 wherein the pressure retractable means includes detent means mounted adjacent said surface and urged to engage in the recesses.

17. A device according to claim 11 further comprising means for feeding sinkers into the passage to engage in said recesses.

References Cited in the file of this patent

UNITED STATES PATENTS

| | | |
|---|---|---|
| 2,603,992 | Brown et al. | July 22, 1952 |
| 2,723,403 | Miller | Nov. 15, 1955 |
| 2,803,977 | Surratt | Aug. 27, 1957 |
| 2,844,059 | Lee | July 22, 1958 |